(12) United States Patent
Chueh

(10) Patent No.: US 11,777,238 B2
(45) Date of Patent: Oct. 3, 2023

(54) RECEPTACLE ASSEMBLY, INTERFACE CARD, AND ELECTRONIC DEVICE HAVING THE SAME

(71) Applicant: WISTRON CORP., New Taipei (TW)

(72) Inventor: Yi-Hsuan Chueh, New Taipei (TW)

(73) Assignee: WISTRON CORP., New Taipei (TW)

( * ) Notice: Subject to any disclaimer, the term of this patent is extended or adjusted under 35 U.S.C. 154(b) by 7 days.

(21) Appl. No.: 17/382,423

(22) Filed: Jul. 22, 2021

(65) Prior Publication Data

US 2022/0376413 A1 Nov. 24, 2022

(30) Foreign Application Priority Data

May 21, 2021 (TW) .................................. 110118554

(51) Int. Cl.
  *H01R 13/66* (2006.01)
  *H01R 12/71* (2011.01)
(52) U.S. Cl.
  CPC .................................. *H01R 12/716* (2013.01)
(58) Field of Classification Search
  CPC .................................................... H01R 12/716
  See application file for complete search history.

(56) References Cited

U.S. PATENT DOCUMENTS

| | | | | |
|---|---|---|---|---|
| 6,590,782 | B2 * | 7/2003 | Fritz | H04Q 1/035 361/752 |
| 6,637,845 | B2 * | 10/2003 | Berg, Jr | H05K 1/0216 312/213 |
| 7,974,098 | B2 | 7/2011 | Oki et al. | |
| 9,246,280 | B2 | 1/2016 | Neer et al. | |
| 9,620,890 | B1 * | 4/2017 | Vino, IV | G02B 6/4293 |
| 9,666,995 | B1 * | 5/2017 | Phillips | H01R 13/6594 |

(Continued)

FOREIGN PATENT DOCUMENTS

| | | |
|---|---|---|
| CN | 211406659 U | 9/2020 |
| JP | 2009099740 A | 5/2009 |

(Continued)

OTHER PUBLICATIONS

TW Office Action dated Dec. 10, 2021 in Taiwan application No. 110118554.

(Continued)

*Primary Examiner* — Abdullah A Riyami
*Assistant Examiner* — Nelson R. Burgos-Guntin
(74) *Attorney, Agent, or Firm* — McClure, Qualey & Rodack, LLP

(57) ABSTRACT

A receptacle assembly is configured to be disposed on a circuit board and to receive a pluggable module and includes a cage member and a connector. The cage member includes a housing portion and at least one fin portion. The housing portion defines an accommodation space and an insertion hole in fluid communication with the accommodation space. The insertion hole is located at one end of the accommodation space. The fin portion is integrally formed with the housing portion and extends outwardly from an outer surface of the housing portion. The connector is located at another end of the accommodation space. The insertion hole is configured for an insertion of the pluggable module into the accommodation space and the connector is configured to be electrically connected to the pluggable module.

20 Claims, 4 Drawing Sheets

(56) References Cited

U.S. PATENT DOCUMENTS

| | | | |
|---|---|---|---|
| 9,853,397 B1* | 12/2017 | Bucher | H01R 13/6335 |
| 10,104,760 B1* | 10/2018 | Briant | G02B 6/4284 |
| 10,306,806 B2 | 5/2019 | Hall, III et al. | |
| 10,374,341 B1* | 8/2019 | Phillips | H01R 12/722 |
| 10,477,729 B2 | 11/2019 | Han et al. | |
| 10,847,929 B2 | 11/2020 | Hamauchi | |
| 11,058,033 B2 | 7/2021 | Han et al. | |
| 11,064,633 B2* | 7/2021 | Wang | H01R 13/518 |
| 11,249,264 B2* | 2/2022 | Edwards, Jr. | G02B 6/4284 |
| 11,553,622 B2* | 1/2023 | Chen | G02B 6/4256 |
| 2008/0153581 A1* | 6/2008 | Hedrick | G07F 17/3202 463/25 |
| 2009/0271551 A1* | 10/2009 | Cheng | G06F 1/185 710/301 |
| 2012/0168122 A1 | 7/2012 | Skepnek et al. | |
| 2012/0257355 A1 | 10/2012 | Yi et al. | |
| 2015/0280368 A1* | 10/2015 | Bucher | G02B 6/4246 439/487 |
| 2016/0064873 A1* | 3/2016 | Bucher | H01R 13/6658 439/59 |
| 2016/0106001 A1 | 4/2016 | Wanha | |
| 2016/0211620 A1* | 7/2016 | Sharf | H01R 12/724 |
| 2016/0211623 A1* | 7/2016 | Sharf | G02B 6/4261 |
| 2016/0211625 A1* | 7/2016 | Sharf | G02B 6/4284 |
| 2017/0133805 A1* | 5/2017 | Lewis | H01R 24/64 |
| 2017/0164518 A1* | 6/2017 | Morgan | G02B 6/43 |
| 2018/0049348 A1* | 2/2018 | Bucher | G02B 6/4271 |
| 2018/0059167 A1* | 3/2018 | Sharf | H01R 13/717 |
| 2018/0159279 A1* | 6/2018 | Bucher | G02B 6/4269 |
| 2018/0205184 A1* | 7/2018 | Briant | H01R 13/518 |
| 2018/0206353 A1* | 7/2018 | Briant | H05K 5/0069 |
| 2018/0310435 A1* | 10/2018 | Sharf | H01R 12/70 |
| 2018/0321715 A1* | 11/2018 | Gopalakrishna | G06F 1/20 |
| 2019/0230817 A1* | 7/2019 | Han | G02B 6/4269 |
| 2020/0022283 A1 | 1/2020 | Han et al. | |
| 2020/0052630 A1* | 2/2020 | Moser | H02K 11/049 |
| 2020/0053906 A1* | 2/2020 | Moser | H05K 7/1432 |
| 2020/0301084 A1* | 9/2020 | Champion | G02B 6/428 |
| 2021/0066859 A1* | 3/2021 | Rita | H01R 13/6691 |
| 2022/0221656 A1* | 7/2022 | Rathinasamy | G02B 6/4292 |
| 2022/0222388 A1* | 7/2022 | Teeter | G06F 1/186 |

FOREIGN PATENT DOCUMENTS

| | | |
|---|---|---|
| JP | 2009152428 A | 7/2009 |
| JP | 2020035800 A | 3/2020 |
| TW | M524593 U | 6/2016 |
| TW | 201937818 A | 9/2019 |

OTHER PUBLICATIONS

JP Office Action dated Aug. 16, 2022 in JP application No. 2021-151641.

JP Office Action dated Jan. 17, 2023 in Japanese application No. 2021151641.

* cited by examiner

RECEPTACLE ASSEMBLY, INTERFACE CARD, AND ELECTRONIC DEVICE HAVING THE SAME

CROSS-REFERENCE TO RELATED APPLICATIONS

This non-provisional application claims priority under 35 U.S.C. § 119(a) on Patent Application No(s). 110118554 filed in Taiwan, R.O.C. on May 21, 2021, the entire contents of which are hereby incorporated by reference.

TECHNICAL FIELD

The disclosure relates to a receptacle assembly and an interface card and an electronic device that have the receptacle assembly.

BACKGROUND

With the advance of technology and change of business model and lifestyle, servers are required to efficiently handle and transfer huge amount of data because of the high demand for remote work, online teaching, learning, meeting, and shopping, and digital transformation in business rapidly increases, and thus ethernet interfaces are employed to offer faster communication speeds and flexible operations regarding various applications.

Ethernet interface uses one or several transceivers as a media access unit to transmit and receive signals. In some cases, the cage for receiving the transceiver is additionally mounted with a heat dissipation module thereon to prevent overheating of the transceiver. However, the installation of the heat dissipation module involves complex and high-cost processes and would result in a high thermal resistance at the interface between the heat dissipation module and the cage, thus the heat transfer is not as expected. Also, the traditional heat dissipation module is undetachable and therefore is unfavorable for maintenance.

SUMMARY

Accordingly, the present disclosure provides a receptacle assembly, and an interface card and an electronic device with the receptacle assembly, where the receptacle assembly is efficient and effective in heat dissipation without involving additional material cost and complex assembly processes.

One embodiment of the disclosure provides an electronic device configured to receive a pluggable module and including a device casing, a circuit board, and at least one receptacle assembly. The circuit board is accommodated in the device casing. The receptacle assembly is disposed on the circuit board. The receptacle assembly includes a housing portion and at least one fin portion. The housing portion is configured to receive the pluggable module. The fin portion is integrally formed with the housing portion and extends outwardly from an outer surface of the housing portion.

Another embodiment of the disclosure provides an interface card configured to receive a pluggable module and including a circuit board and at least one receptacle assembly. The receptacle assembly is disposed on the circuit board. The receptacle assembly includes a housing portion and at least one fin portion. The housing portion is configured to receive the pluggable module. The fin portion is integrally formed with the housing portion and extends outwardly from an outer surface of the housing portion.

Another embodiment of the disclosure provides a receptacle assembly configured to be disposed on a circuit board and to receive a pluggable module and including a cage member and a connector. The cage member includes a housing portion and at least one fin portion. The housing portion defines an accommodation space and an insertion hole in fluid communication with the accommodation space. The insertion hole is located at one end of the accommodation space. The fin portion is integrally formed with the housing portion and extends outwardly from an outer surface of the housing portion. The connector is located at another end of the accommodation space. The insertion hole is configured for an insertion of the pluggable module into the accommodation space and the connector is configured to be electrically connected to the pluggable module.

According to the receptacle assembly, the interface card, and the electronic device as discussed in the above embodiments of the disclosure, at least one fin portion is integrally formed on the outer surface of the housing portion of the receptacle assembly to increase the exposed surface area of the receptacle assembly in contact with ambient air, thus the receptacle assembly is effective and efficient in cooling the pluggable module and therefore is beneficial to prevent the pluggable module from overheating.

According to thermal analysis tests of the receptacle assembly of the disclosure and a cage without any fin structure under the same test conditions, the receptacle assembly with fin portions integrally formed on its cage member significantly decreases the working temperature of the pluggable module compared to the working temperature of the same type of pluggable module in the cage without fin structure; that is, the existence of the fin portions can contribute to a great decrease in the working temperature of the pluggable module therein. This shows that the receptacle assembly with fin portions is beneficial to prevent the pluggable module from overheating and thus heat is prevented from affecting the transmission speed.

In addition, compared to the cage with a heat dissipation module additionally mounted thereon, the fin portions of the receptacle assembly of the disclosure are integrally formed on the cage member and thus can obtain a higher heat transfer rate without involving additional material cost and complex assembly processes.

Furthermore, the cage member of the receptacle assembly may be in tight contact with the pluggable module therein, thus the heat transfer interruption and increase of thermal resistance between the pluggable module and the cage member are because of air gaps or other intermediary material is avoided.

As such, the receptacle assembly of the disclosure is able to achieve a significant improvement in heat transfer while having lower production costs and does not involve complex assembly processes. Since there are no complex processes for assembling the receptacle assembly, it will be easy to remove and install the receptacle assembly, and therefore the receptacle assembly is favorable for maintenance processes.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
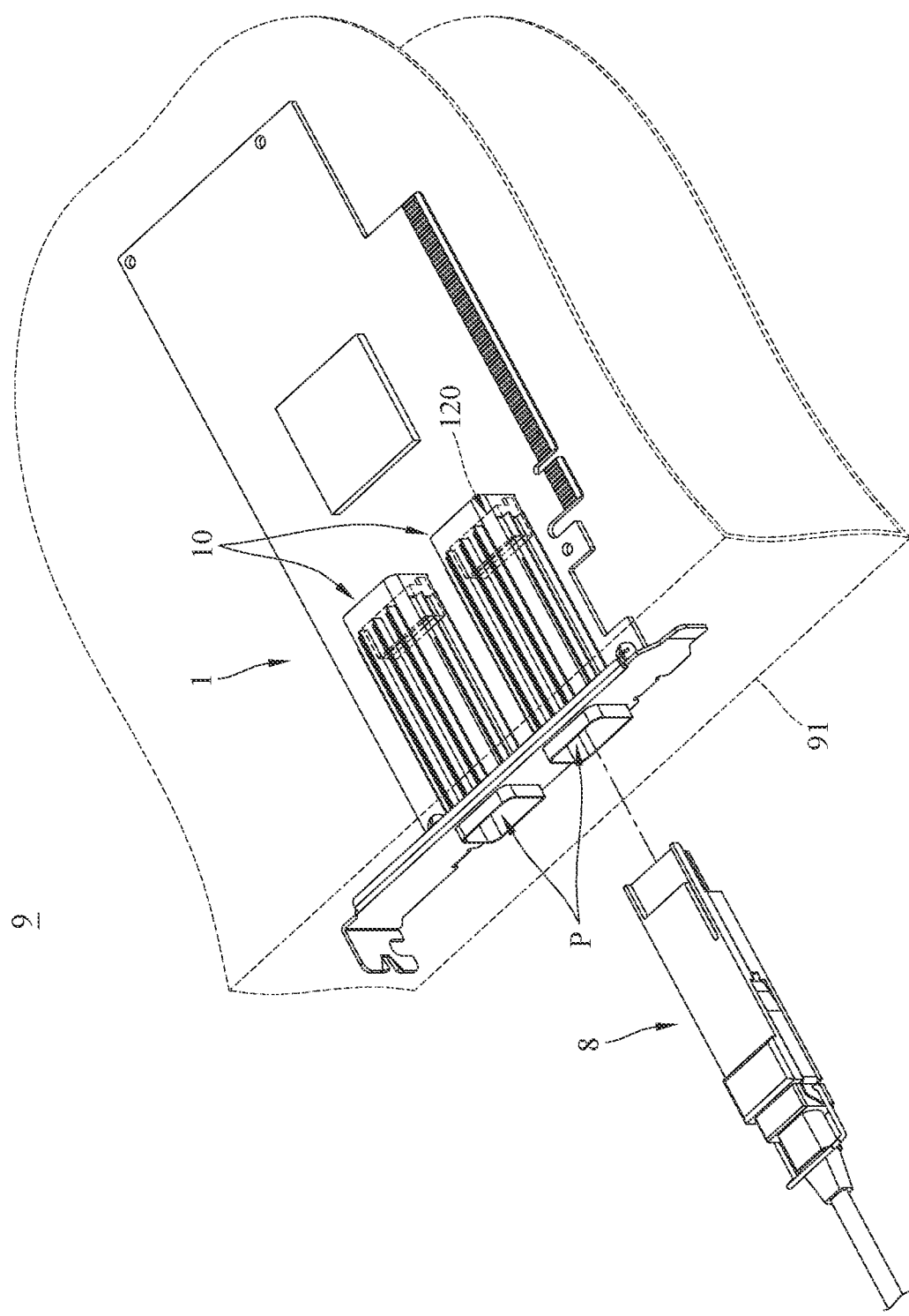
FIG. 1 is a partially enlarged perspective view of an electronic device according to one embodiment of the disclosure.
Figure 2:
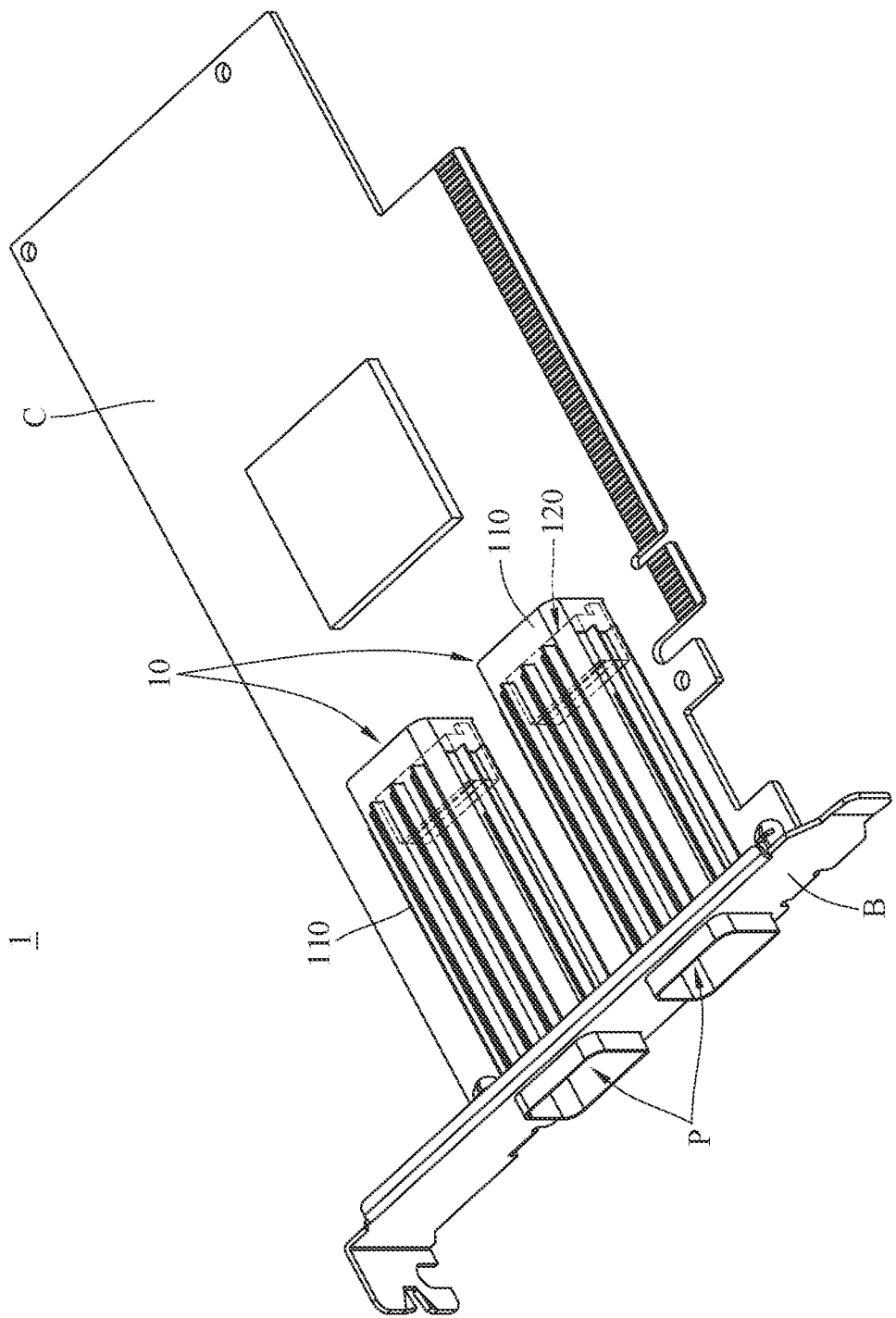
FIG. 2 is a perspective view of the interface card in FIG. 1.
Figure 3:
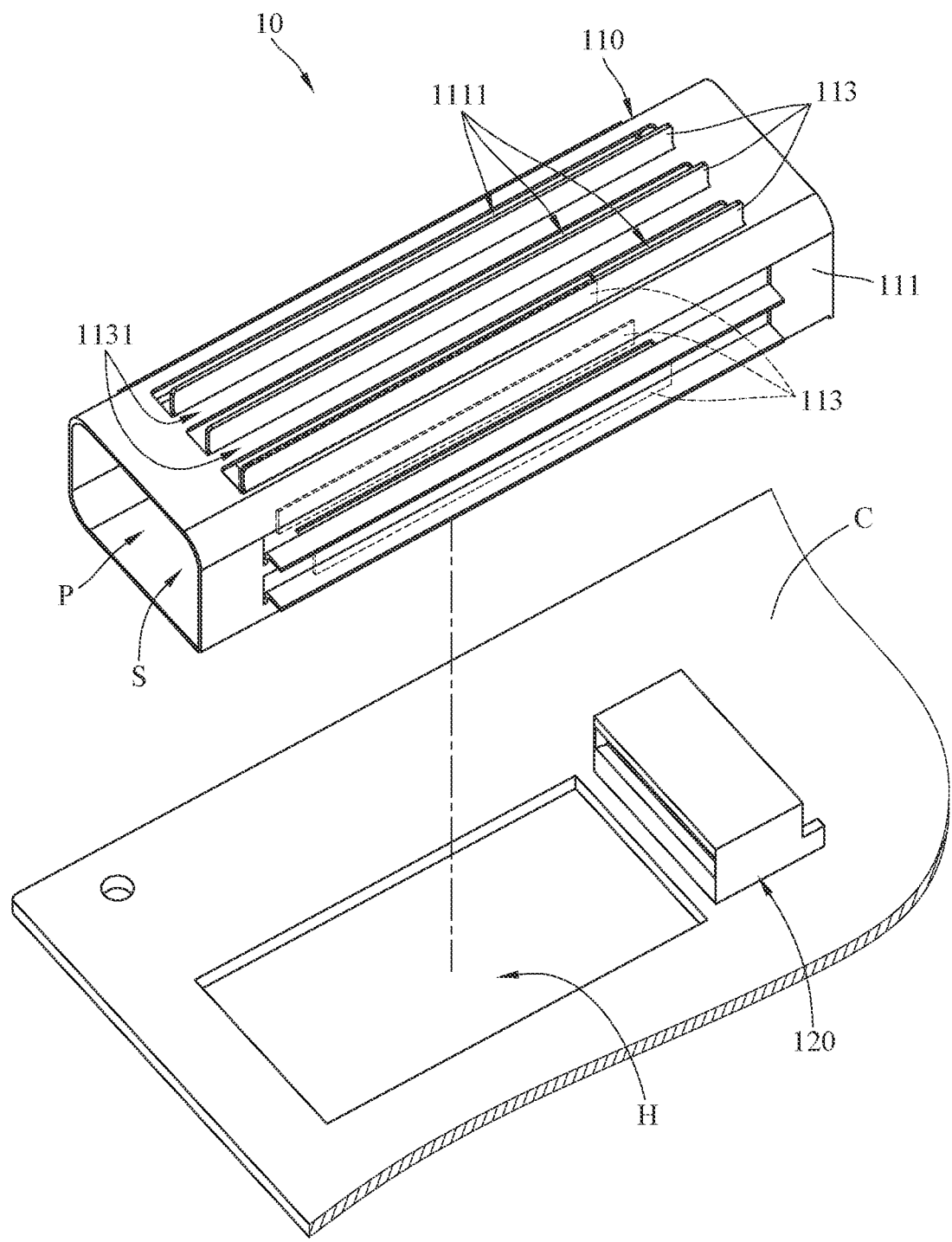
FIG. 3 is an exploded view of the interface card in FIG. 2.

In the following detailed description, for purposes of explanation, numerous specific details are set forth in order to provide a thorough understanding of the disclosed embodiments. It will be apparent, however, that one or more embodiments may be practiced without these specific details.

The following embodiments will be described with reference to the drawings. For the purpose of clear illustration, some conventional elements and components may be illustrated in a simple and clear manner. Some of the features in the drawings may be slightly exaggerated or illustrated in a larger proportion for the ease of viewing but are not intended to limit the disclosure. In addition, for the same reason, some of the elements or components in the drawings may be illustrated in dotted lines.

Herein, the terms, such as "end", "part", "portion", "area", may be used to refer to specific features of or between elements or components but are not intended to limit the elements and components. In addition, the terms, such as "substantially" and "approximately", as used herein may mean a reasonable amount of deviation of the described term such that the end result is not significantly changed.

Further, unless explicitly stated, the term "at least one" as used herein may mean that the quantity of the described element or component is one or larger than one but does not necessarily mean that the quantity is only one. The term "and/or" may be used herein to indicate that either or both of two stated possibilities.

Firstly, referring to FIGS. 1-4, one embodiment of the disclosure provides an electronic device 9. The electronic device 9 includes a device casing 91 capable of accommodating one or more receptacle assemblies 10 therein. The electronic device 9 may be, but not limited to, a communication device, a part of a communication device, or a device or a part used with a communication device. For example, the electronic device 9 may be a router, a server, a network interface, a storage system, or a part of any one of the aforementioned devices, but it is noted that the disclosure is not limited by the type and application of the electronic device 9.

The receptacle assemblies 10 are accommodated in the device casing 91 of the electronic device 9 and are able to receive one or more hot-pluggable module. As shown, a pluggable module 8 is pluggably inserted into any one of the receptacle assemblies 10 from the outside of the electronic device 9.

The pluggable module 8 may be a small form-factor pluggable (SFP) transceiver, a quad small form-factor pluggable (QSFP) transceiver, or any transceiver as is well known in the art. When the pluggable module 8 is inserted into the receptacle assembly 10, it can be in communication with other electric component/modules (not shown) in the electronic device 9. Note that the pluggable module 8 is only provided for ease of understanding the function of the receptacle assembly 10, and the disclosure is not limited by the pluggable module 8 and its configuration.

The receptacle assemblies 10 may be fixed on a circuit board C using any suitable manner. Each receptacle assembly 10 has a connector 120 mounted on and electrically connected to the circuit board C. The connector 120 may be a card edge connector configured to receive a plug-in card edge (not shown) on the pluggable module 8 as is well known in the art. That is, the connector 120 is configured to be electrically connected to the pluggable module 8. Note that the connector 120 may be in any form suitable for mating the pluggable module 8, and the disclosure is not limited by the connector 120 and its configuration. The circuit board C may be, but not limited to, a daughter card or a motherboard. Note that the disclosure is not limited by the circuit board C and its configuration. In this embodiment, the circuit board C may have an edge connector (not numbered) that can connect to a mainboard or another circuit board (not shown) within the electronic device 9. With such a configuration, the circuit board C and the receptacle assemblies 10 and relevant components thereon together form a hot-pluggable interface card 1 that is selectively installed in the electronic device 9. Note that the quantity of the receptacle assemblies 10 within one interface card 1 may be modified as required; for example, there may be only one receptacle assembly in the interface card of another embodiment. In addition, in this embodiment, a baffle B is mounted on one side of the circuit board C and configured to be fixed to the device casing 91 of the electronic device 9 by any suitable manner, such that the position of the receptacle assemblies 10 in the device casing 91 is further secured. In addition, the baffle B has one or more openings (not numbered) respectively corresponding to and exposing insertion holes P of the receptacle assemblies 10. Note that the baffle B is optional and its configuration may be modified as required and not intended to limit the disclosure.

In more detail, each of the receptacle assemblies 10 may include a cage member 110 and the aforementioned connector 120. The cage member 110 may be fixed on the circuit board C by any suitable manner. The cage member 110 may be, but not limited to, a single integral piece made of any suitable metal (e.g., aluminum or copper). As shown, the cage member 110 may be a hollow quadrilateral cuboid having an accommodation space S therein and an insertion hole P exposing the accommodation space S. The insertion hole P is located at one end of the accommodation space S, while the connector 120 is located at the other end of the accommodation space S opposite to the insertion hole P. The insertion hole P is configured for the insertion of the pluggable module 8; in other words, the pluggable module 8 is allowed to be inserted into the accommodation space S through the insertion hole P. The inner walls of the cage member 110 may be in tight contact with the pluggable module 8 so that cage member 110 can guide the pluggable module 8 to move towards the connector 120 in a predetermined direction.

In addition, the cage member 110 is beneficial to dissipate heat for the pluggable module 8 so as to prevent it from overheating. In detail, in this embodiment, the cage member 110 of the receptacle assembly 10 may include a housing portion 111 and a plurality of fin portions 113, the housing portion 111 defines the accommodation space S and the insertion hole P, the fin portions 113 protrude outwardly from the outer surface of the housing portion 111, and the housing portion 111 has vent holes 1111 respectively located adjacent to the fin portions 113. The vent holes 1111 expose the accommodation space S; in other words, the vent holes 1111 connect to or in fluid communication with the accommodation space S. As shown, understandably, the vent holes 1111 are holes left after the fin portions 113 being folded at an angle to the housing portion 111. The vent holes 1111 are in fluid communication with the accommodation space S, thus the vent holes 1111 allow heat in the accommodation space S to flow out of the cage member 110.

Also, the fin portions 113 at each side of the housing portion 111 are spaced apart from each other. As shown, every two of the fin portions 113 adjacent to each other form an air channel 1131 therebetween, allowing the heat coming out from the vent hole 1111 and the surface of the fin portions 113 to escape away from the cage member 110.

With such a configuration of the cage member 110, when the pluggable module 8 is in the housing portion 111 of the cage member 110, the heat generated by the pluggable module 8 may flow out through the vent holes 1111, meanwhile, the housing portion 111 may be in direct thermal contact with the pluggable module 8 and thus may directly absorb the heat generated by the pluggable module 8 and dissipate it outside. The heat absorbed by the housing portion 111 is transferred to the fin portions 113 and dissipated outside through the fin portions 113. Since the fin portions 113 increase the exposed surface area of the receptacle assembly 10 in contact with ambient air, the rate of heat transfer is significantly improved, such that the receptacle assembly 10 is effective and efficient in cooling the pluggable module 8 and therefore is beneficial to prevent the pluggable module 8 from overheating.

According to thermal analysis tests of the cage member 110 and a cage without any fin structure under the same test conditions, the cage member 110 can decrease the working temperature of the pluggable module 8 down to approximately 52° C. while the pluggable module 8 in the cage without any fin structure is at a relatively high working temperature of around 56.5° C.; that is, the existence of the fin portions 113 can contribute to a temperature decrease of around 4° C. This shows that the fin portions are significantly beneficial to prevent the pluggable module 8 from overheating, and thus heat is prevented from affecting the transmission speed.

In addition, compared to the cage with a heat dissipation module additionally mounted thereon, the fin portions 113 are integrally formed on the cage member 110 of the receptacle assembly 10 and thus can obtain a higher heat transfer rate without involving additional material cost and complex assembly processes. Furthermore, the pluggable module 8 may be in tight contact with the cage member 110, thus the heat transfer interruption and increase of thermal resistance between the pluggable module 8 and the cage member 110 are because of air gaps or other intermediary material is avoided. As such, the receptacle assembly 10 is able to achieve a significant improvement in heat transfer while having lower production costs and does not involve complex assembly processes. Since there are no complex processes for assembling the receptacle assembly 10, it is easy to remove and install the receptacle assembly 10, and therefore the receptacle assembly 10 is favorable for maintenance processes.

Figure 4:
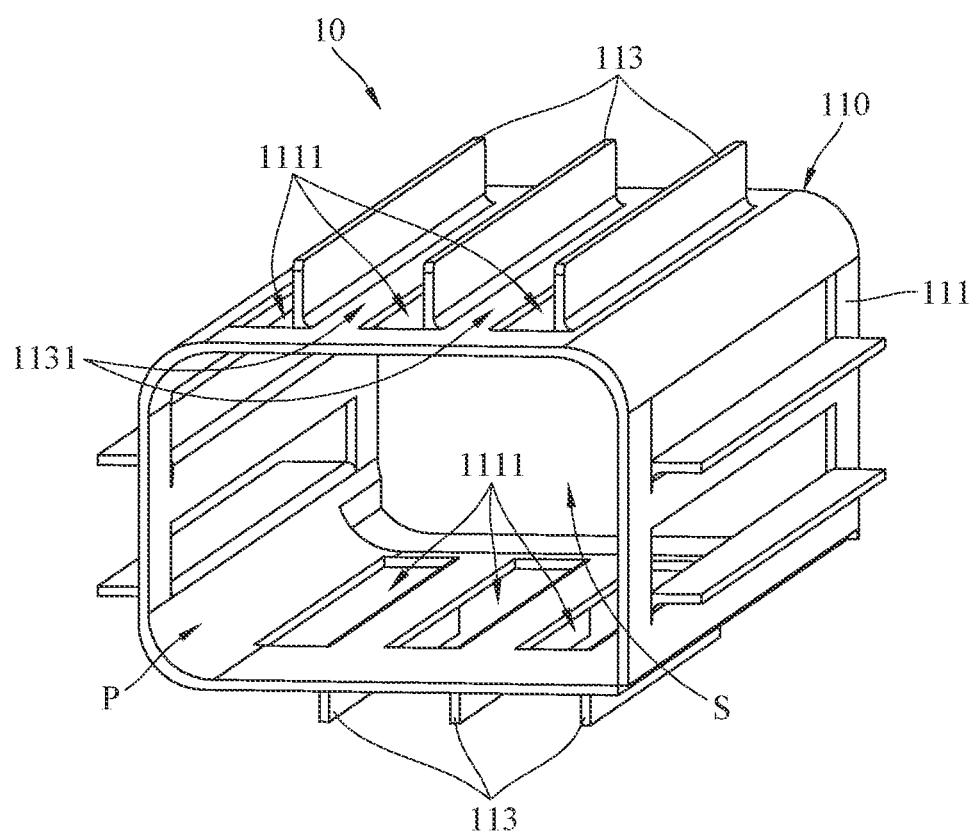
FIG. 4 is a perspective view of a cage member of a receptacle assembly in FIG. 2.

In addition, in this embodiment, the housing portion 111 of the cage member 110 of the receptacle assembly 10 is a hollow quadrilateral cuboid with fin portions 113 protruding from four sides thereof. As shown in FIG. 4, the side of the housing portion 111 for being attached to the circuit board C has one or more fin portions 113 protruding outwardly therefrom; in other words, part of the fin portions 113 are located at the side of the housing portion 111 facing towards the circuit board C. To adapt these fin portions 113, the circuit board C may have a through hole H for the insertion of these fin portions 113 without having interference with them. In other words, at least one of the fin portions 113 protrudes outwardly from a side of the housing portion 111 facing towards the circuit board C and passing through the through hole H. In such a configuration of the cage member 110, the heat generated by the pluggable module 8 can be dissipated to outside from all sides of the cage member 110, obtaining a high heat-transfer rate.

Note that the receptacle assembly 10 of the aforementioned embodiment is exemplary and not intended to limit the disclosure. Any proper modification that does not depart from the spirit of the disclosure to the receptacle assembly is applicable. For example, the quantity, height, angle, arrangement of the fin portions at the same side of the cage member of the receptacle assembly all may be modified as required; in other embodiments, there may be only one fin portions protruding from one side of the housing portion of the cage member; in some other embodiments, there may be only one side of the housing portion of the cage member has one or more fin portions protruding therefrom; in another embodiment, the fin portions at the same side of the housing portion may be different in height, angle, and/or longitude length; in yet another embodiment, the fin portions at one side of the housing portion of the cage member may be arranged in an N×M array, where N and M denote a positive integer.

In addition, the receptacle assembly 10 of the aforementioned embodiment is for receiving one pluggable module 8, but the disclosure is not limited thereto. In other embodiments, the housing portion of the receptacle assembly may have a plurality of insertion holes for receiving multiple pluggable modules at a time. Further, in some other embodiments, the housing portion of the receptacle assembly may be a box-shaped structure with an opening facing towards the circuit board; in this configuration, the housing portion may only cover three sides of the pluggable module.

According to the receptacle assembly and the interface card and electronic device that have the receptacle assembly as discussed in the above embodiments of the disclosure, at least one fin portion is integrally formed on the outer surface of the housing portion of the receptacle assembly to increase the exposed surface area of the receptacle assembly in contact with ambient air, thus the receptacle assembly is effective and efficient in cooling the pluggable module and therefore is beneficial to prevent the pluggable module from overheating.

According to thermal analysis tests of the receptacle assembly of the disclosure and a cage without any fin structure under the same test conditions, the receptacle assembly with fin portions integrally formed on its cage member significantly decreases the working temperature of the pluggable module compared to the working temperature of the same type of pluggable module in the cage without fin structure; that is, the existence of the fin portions can contribute to a great decrease in the working temperature of the pluggable module therein. This shows that the receptacle assembly with fin portions is beneficial to prevent the pluggable module from overheating and thus heat is prevented from affecting the transmission speed.

In addition, compared to the cage with a heat dissipation module additionally mounted thereon, the fin portions of the receptacle assembly of the disclosure are integrally formed on the cage member and thus can obtain a higher heat transfer rate without involving additional material cost and complex assembly processes.

Furthermore, the cage member of the receptacle assembly may be in tight contact with the pluggable module therein, thus the heat transfer interruption and increase of thermal resistance between the pluggable module and the cage member are because of air gaps or other intermediary material is avoided.

As such, the receptacle assembly of the disclosure is able to achieve a significant improvement in heat transfer while having lower production costs and does not involve complex assembly processes. Since there are no complex processes for assembling the receptacle assembly, it will be easy to remove and install the receptacle assembly, and therefore the receptacle assembly is favorable for maintenance processes.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An electronic device, configured to receive a pluggable module, comprising:
    a device casing;
    a circuit board, being accommodated in the device casing; and
    at least one receptacle assembly, disposed on the circuit board, wherein the at least one receptacle assembly comprises a housing portion and at least one fin portion, the housing portion is configured to receive the pluggable module, the at least one fin portion is integrally formed with the housing portion and extends outwardly from an outer surface of the housing portion, each of the at least one fin portion has an elongated shape extending between one and the other ends of the housing portion in an insertion direction of the pluggable module.

2. The electronic device according to claim 1, wherein the housing portion defines an accommodation space and an insertion hole in fluid communication with the accommodation space, the insertion hole is located at one end of the accommodation space and configured for an insertion of the pluggable module into the accommodation space.

3. The electronic device according to claim 1, wherein the at least one fin portion comprises a plurality of fin portions located at different sides of the housing portion.

4. The electronic device according to claim 3, wherein the circuit board has a through hole, at least one of the plurality of fin portions protrudes outwardly from a side of the housing portion facing towards the circuit board and passing through the through hole.

5. The electronic device according to claim 3, wherein every two of the plurality of fin portions adjacent to each other form an air channel therebetween.

6. The electronic device according to claim 1, wherein the housing portion has at least one vent hole located adjacent to the at least one fin portion and in fluid communication with the accommodation space.

7. An interface card, configured to receive a pluggable module, comprising:
    a circuit board; and
    at least one receptacle assembly, disposed on the circuit board, wherein the at least one receptacle assembly comprises a housing portion and at least one fin portion, the housing portion is configured to receive the pluggable module, the at least one fin portion is integrally formed with the housing portion and extends outwardly from an outer surface of the housing portion, each of the at least one fin portion has an elongated shape extending between one and the other ends of the housing portion in an insertion direction of the pluggable module.

8. The interface card according to claim 7, wherein the housing portion defines an accommodation space and an insertion hole in fluid communication with the accommodation space, the insertion hole is located at one end of the accommodation space and configured for an insertion of the pluggable module into the accommodation space.

9. The interface card according to claim 7, wherein the at least one fin portion comprises a plurality of fin portions located at different sides of the housing portion.

10. The interface card according to claim 9, wherein the circuit board has a through hole, at least one of the plurality of fin portions protrudes outwardly from a side of the housing portion facing towards the circuit board and passing through the through hole.

11. The interface card according to claim 9, wherein every two of the plurality of fin portions adjacent to each other form an air channel therebetween.

12. The interface card according to claim 7, wherein the housing portion has at least one vent hole located adjacent to the at least one fin portion and in fluid communication with the accommodation space.

13. A receptacle assembly, configured to be disposed on a circuit board and to receive a pluggable module, comprising:
    a cage member, comprising:
        a housing portion, defining an accommodation space and an insertion hole in fluid communication with the accommodation space, wherein the insertion hole is located at one end of the accommodation space; and
        at least one fin portion, being integrally formed with the housing portion and extending outwardly from an outer surface of the housing portion, each of the at least one fin portion has an elongated shape extending between one and the other ends of the housing portion in an insertion direction of the pluggable module; and
    a connector, being located at another end of the accommodation space;
    wherein the insertion hole is configured for an insertion of the pluggable module into the accommodation space and the connector is configured to be electrically connected to the pluggable module.

14. The receptacle assembly according to claim 13, wherein the at least one fin portion comprises a plurality of fin portions located at different sides of the housing portion.

15. The receptacle assembly according to claim 14, wherein at least one of the plurality of fin portions protrudes outwardly from a side of the housing portion facing towards the circuit board and passing through a through hole of the through hole.

16. The receptacle assembly according to claim 14, wherein every two of the plurality of fin portions adjacent to each other form an air channel therebetween.

17. The receptacle assembly according to claim 13, wherein the housing portion has at least one vent hole located adjacent to the at least one fin portion and in fluid communication with the accommodation space.

18. The electronic device according to claim 1, wherein the housing portion has a plurality of vent holes in fluid communication with an accommodation space defined by the housing portion, each of the plurality of vent holes has an elongated shape extending between one and the other ends of the housing portion in the insertion direction of the pluggable module, and the at least one fin portion comprises a plurality of fin portions located at different sides of the housing portion and are respectively located in vicinity of the plurality of vent holes, the plurality of vent holes and the plurality of fin portions are arranged one after another along a circumferential direction of the housing portion on each of the different sides of the housing portion.

19. The interface card according to claim 7, wherein the housing portion has a plurality of vent holes in fluid communication with an accommodation space defined by the housing portion, each of the plurality of vent holes has an elongated shape extending between one and the other ends of the housing portion in the insertion direction of the pluggable module, and the at least one fin portion comprises a plurality of fin portions located at different sides of the housing portion and are respectively located in vicinity of the plurality of vent holes, the plurality of vent holes and the plurality of fin portions are arranged one after another along a circumferential direction of the housing portion on each of the different sides of the housing portion.

20. The receptacle assembly according to claim 13, wherein the housing portion has a plurality of vent holes in fluid communication with an accommodation space defined by the housing portion, each of the plurality of vent holes has an elongated shape extending between one and the other ends of the housing portion in the insertion direction of the pluggable module, and the at least one fin portion comprises a plurality of fin portions located at different sides of the housing portion and are respectively located in vicinity of the plurality of vent holes, the plurality of vent holes and the plurality of fin portions are arranged one after another along a circumferential direction of the housing portion on each of the different sides of the housing portion.

\* \* \* \* \*